Patented Dec. 19, 1933

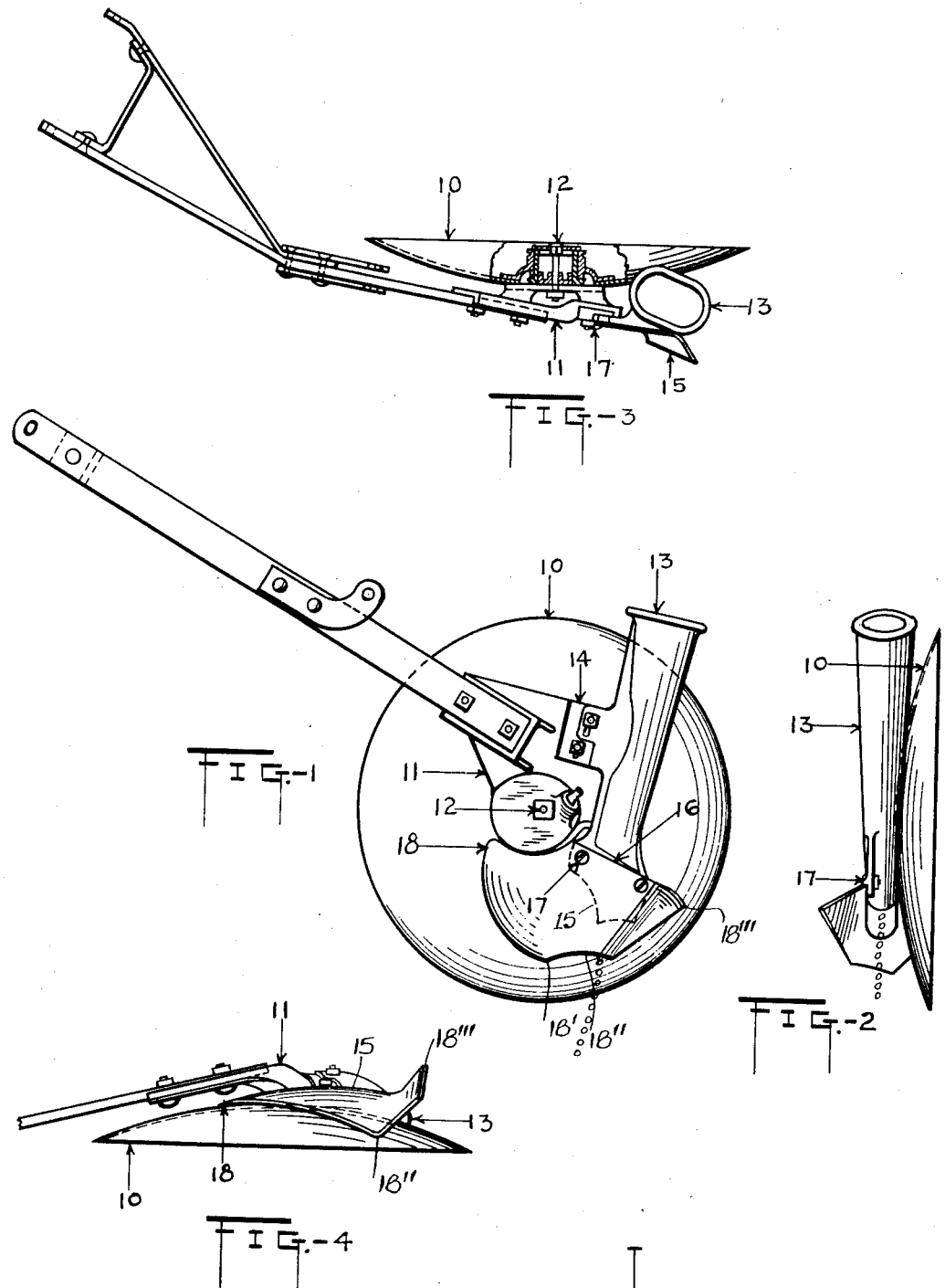

1,940,273

UNITED STATES PATENT OFFICE 1,940,273

LISTER DISK FURROW OPENER

Peter W. Schwab, Peoria, Ill., assignor to Peoria Drill & Seeder Co., Peoria, Ill., a corporation of Illinois Application July 29, 1929. Serial No. 382,050

1 Claim. (Cl. 111—87)

This invention relates to lister disk furrow openers.

One of the objects of the invention is in the provision of a disk for use in connection with drills, said disk being adapted to open an extremely wide furrow, such furrow opening operation being accomplished by the use of a specially shaped shoe which acts as a guard for the grain conduit.

Another object lies in the provision of a grain conduit guard used in connection with the disk member, said conduit permitting the disk to open an extremely wide and deep furrow, the guard being so fashioned as not only to overcome the side draft but also to hold the soil sufficient time to permit the planting of the seed.

Still another object lies in the provision of a disk having a grain conduit and shoe member attached thereto, said grain conduit and shoe having a detachable as well as adjustable connection with the disk support member.

A further object lies in the provision of a special shoe for guarding the grain conduit on a lister disk, said shoe being so arranged as to permit the disk to open an extremely wide and deep furrow as well as pack the soil about the shoe during its passage in order to permit the grain to be deposited before the lateral movement of the soil immediately following the passage of the disk therethrough.

Other objects will appear in the following specification, taken in connection with the annexed drawing, in which—

Fig. 1 is a side elevation of the disk showing the manner of attaching the grain conduit and shoe;

Fig. 2 is a rear elevation;

Fig. 3 is a plan view from above; and

Fig. 4 is a plan view from below.

Before referring to the drawing, it might be stated that disks having grain conduits and shoes therefor are generally well known in the art, as well as the commercial field, the same being adapted to be used in substantially the same manner as the disk, grain conduit and shoe herein shown. However, the ordinary lister disk with grain conduit and shoe attachment, when used, as is almost always the case, in a trashy soil, is unable to penetrate the soil to such considerable extent as to permit efficient depositing of the grain. Obviously, shallow planting will result in either seed blowing, soil drifting or winter kill of the wheat.

The ordinary disk with grain conduit and guard shoe therefore is prevented from penetrating the trashy soil to any great extent because of the shape and disposition of the guard member therefor.

The present applicant, who has been connected with a manufacturer of drills and seed mechanism for a great many years, has devised a guard so shaped as to permit the opening of an extremely wide and deep furrow in trashy soil, and this with the utmost efficiency in the manner in which the wheat is deposited.

In the drawing, there appears merely the lister disk 10 of a drill, as it has not been thought necessary to include a showing of the entire drill. As is well known, there is considerable side draft to disks of this sort, and as stated before, they are adapted to be used generally in land that is trashy. A conventional supporting bracket 11 is securely pivoted as at 12 to the disk in a conventional manner. The grain conduit 13 has a detachable and adjustable bolted connection 14 with the previously mentioned bracket 11.

The above described slotted and bolted connection between the grain conduit and bracket permits such rocking of the grain conduit as will insure satisfactory adjustment not only of the grain conduit but also of the guard shoe, generally referred to as 15, the same being detachably connected at 16 to the lower extremity of the grain conduit by means of the screws 17. Such adjustment of the grain conduit and guard shoe permits the disk to be used in soils of various densities, as well as compensating for any wear upon the shoe and permitting replacement of parts in case of structural failure or wear.

Now, referring specifically to the shoe, it will be noted that the forward or leading edge 18 of the shoe conforms to and lies immediately adjacent the disk, which rotates upon its previously described pivot 12. The leading edge is cut away at 18' towards the rear in a stream line manner so as to permit initial and deep penetration of the disk and shoe into the usual trashy soil.

At the lower end of the stream line edge, which is immediately adjacent the bottom edge of the disk, the shoe is then flared upwardly and outwardly at a point slightly in front and laterally of a point where the wheat would naturally fall as indicated at 18''. This flaring of the intermediate and rear portion of the shoe is increased in a stream line manner upwardly to such an extent that the upper right hand tip of the shoe 18''' extends laterally rather sharply.

The particular shape of the before mentioned shoe is important for the following reasons. The shoe, due to its stream line and cut-back leading edge, permits the disk and grain depositing mechanism to cut through the trashy soil not only to a satisfactory planting depth, but also to one which has never been approached with any other type of disk.

Due to this stream lining and cut-back leading edge of the shoe, the disk is permitted initially to penetrate deeply, and once having penetrated to such a distance, the slight upward and lateral flare of the lower part of the shoe prevents the soil from being forced underneath the shoe and operates not only to pack the same slightly but also to permit any loose soil, due to the gradual lateral flare, to be carried upwardly and out of the path of the shoe.

The increased lateral flaring of the upper right hand portion of the shoe further prevents any forcing of loose soil over the shoe and operates to hold such soil in a lateral and slightly packed position until the wheat has been deposited at the deepest point in the furrow.

It is apparent that the particular shape of the shoe has several advantages which are not found in disks having guard shoes and which merely protect the grain conduit and being fashioned, of course, to divert to a certain extent the soil in a lateral manner immediately in front of the distributing end of the grain conduit. In the present instance, the particular fashioning of the shoe permits first the opening of a furrow over an extremely wide surface, second the soil is sufficiently packed at the side of the disk and grain conduit to permit the formation of a satisfactory ridge, and therefore the proper planting of the grain without the upward displacement of the disk and grain delivery mechanism which usually occurs when the ordinary disk and grain delivery portion passes through the field.

The fact that the shoe conforms to the shape of the disk also permits automatic cleaning of the disk in a manner not found in other combined disks and guard shoes.

Again, it is noted that the particular shape of the shoe overcomes to a large extent the normal side draft of the disk. Finally, the streamlining of the leading edge of the disk and the peculiar flaring of the lower portion, which is further increased at the upper part of the shoe, operate to hold the trashy soil a sufficient length of time to permit the grain to be deposited deeply.

It might be stated that this particular shoe cleans the trash thoroughly and permits the depositing of the grain in such manner and so deeply as to prevent seed blowing, soil shifting, or any possibility of winter kill.

Further, the manner of attachment of the grain conduit and shoe to the disk support is considered novel. The slotted and bolted connection for the grain conduit permits such rocking of the casting as to not only allow quick replacement of parts, but such adjustment as may be necessary to compensate for wear upon the parts. Similarly, the shoe has a detachable connection with the grain conduit, therefore affording quick detachment in case replacement is necessary.

What I claim is:

In a device of the class described, in combination, a support, a disk rotatably mounted thereon, a grain conduit secured to the support having its distributing end disposed in a manner to deposit grain in a furrow opened by the disk and a guard shoe for the grain conduit, said guard shoe having its leading edge conforming to the shape of the disk and being cut away rearwardly to a point immediately in front of a point at which the grain normally would be deposited, the shoe being flared slightly laterally from the lowermost point of the leading edge, said flare being increased gradually rearwardly and upwardly throughout the remaining portion of the shoe to a point rearwardly of the grain conduit in such manner as to permit the opening by the disk of a wide and deep furrow and the depositing of the grain therein.

PETER W. SCHWAB.